United States Patent [19]
Kato et al.

[11] Patent Number: 5,450,439
[45] Date of Patent: Sep. 12, 1995

[54] COMMUNICATION-TRACING-INFORMATION PROCESSING DEVICE

[75] Inventors: Shitashi Kato; Tetuzi Ota, both of Fujisawa, Japan

[73] Assignee: Matsushita Graphic Communication Systems, Inc., Tokyo, Japan

[21] Appl. No.: 924,981

[22] Filed: Aug. 5, 1992

[30] Foreign Application Priority Data

Aug. 28, 1991 [JP] Japan .................................. 3-217489
Mar. 17, 1992 [JP] Japan .................................. 4-060118

[51] Int. Cl.⁶ .............................................. H04B 3/46
[52] U.S. Cl. .................................... 375/224; 370/60; 370/94.1; 370/95.1; 371/2.2; 371/21.1; 395/185.01
[58] Field of Search ................. 370/60, 94.1, 95.1; 375/10; 371/2.2, 10.1, 13, 21.1

[56] References Cited

U.S. PATENT DOCUMENTS

| | | | |
|---|---|---|---|
| 4,603,416 | 7/1986 | Servel et al. | 370/60 |
| 4,703,475 | 10/1987 | Pretzka et al. | 370/60 |
| 4,788,679 | 11/1988 | Kataoka et al. | 370/60 |
| 4,884,263 | 11/1989 | Suzuki | 370/60 |
| 4,905,231 | 2/1990 | Leung et al. | 370/60 |
| 5,090,011 | 2/1992 | Fukuta et al. | 370/60 |
| 5,233,607 | 8/1993 | Baring et al. | 370/15 |
| 5,235,559 | 8/1993 | Nishimura et al. | 370/16.1 |
| 5,251,207 | 10/1993 | Abensour et al. | 370/60.1 |

Primary Examiner—Stephen Chin
Assistant Examiner—Amanda T. Le
Attorney, Agent, or Firm—Lowe, Price, LeBlanc & Becker

[57] ABSTRACT

A communication device connected to a packet network, which is provided with a storage portion having communication-tracing-information storing areas respectively assigned to logical channels and a communication processing portion for identifying a logical channel by a network header of transmission or reception data obtained from the packet network when the transmission or reception data is generated, and for writing communication-tracing-information corresponding to the generated transmission or reception data to a communication-tracing-information storing area assigned to the identified logical channel. Thus, communication-tracing-information is stored in the communication-tracing-information storing areas respectively corresponding to logical channels. Thereby, the stored communication-tracing-information corresponding to a logical channel is not written over that corresponding to another logical channel. Therefore, if a communication fault occurs correspondingly to a logical channel and thereafter a normal communication processing is effected correspondingly to another logical channel, communication-tracing-information corresponding to the logical channel, in which the communication fault has occurred, can be retained. Consequently, communication-tracing-information corresponding to a logical channel, in which a communication fault occurs, can surely be retained and easily be fetched without increasing the cost. Moreover, an analysis of the communication fault can efficiently be performed.

3 Claims, 10 Drawing Sheets

(WHEN SAVING IS COMPLETED AFTER NTH RESET OCCURS)

FIG. 10(a)

(WHEN NTH RESET OCCURS)

COMMUNICATION-TRACING-INFORMATION PROCESSING DEVICE

BACKGROUND OF THE INVENTION

1. Field of The Invention

This invention generally relates to a communication device connected to a packet switching network and more particularly to what is called a communication-tracing-information processing device.

2. Description of The Related Art

Generally, the state of a communication system is constantly "traced" (namely, data representing the current state of the communication system is constantly recorded) with the intention of analyzing the cause of a communication fault occurring therein and of preventing a recurrence of such a communication fault. Similarly as in case of a recorder used for an analysis of an air accident, there is a limit to the storage capacity of a device for storing communication data (hereunder sometimes referred to as tracing data) obtained as a result of performing a tracing the state of the communication system. Thus, if tracing data to be stored excesses the storage capacity of the device, the excess tracing data is sequentially overwritten to the storage area, in which the tracing data previous to the excess tracing data has been stored, of the device. Consequently, the device usually stores a fixed magnitude or size of tracing data.

Figure 3:
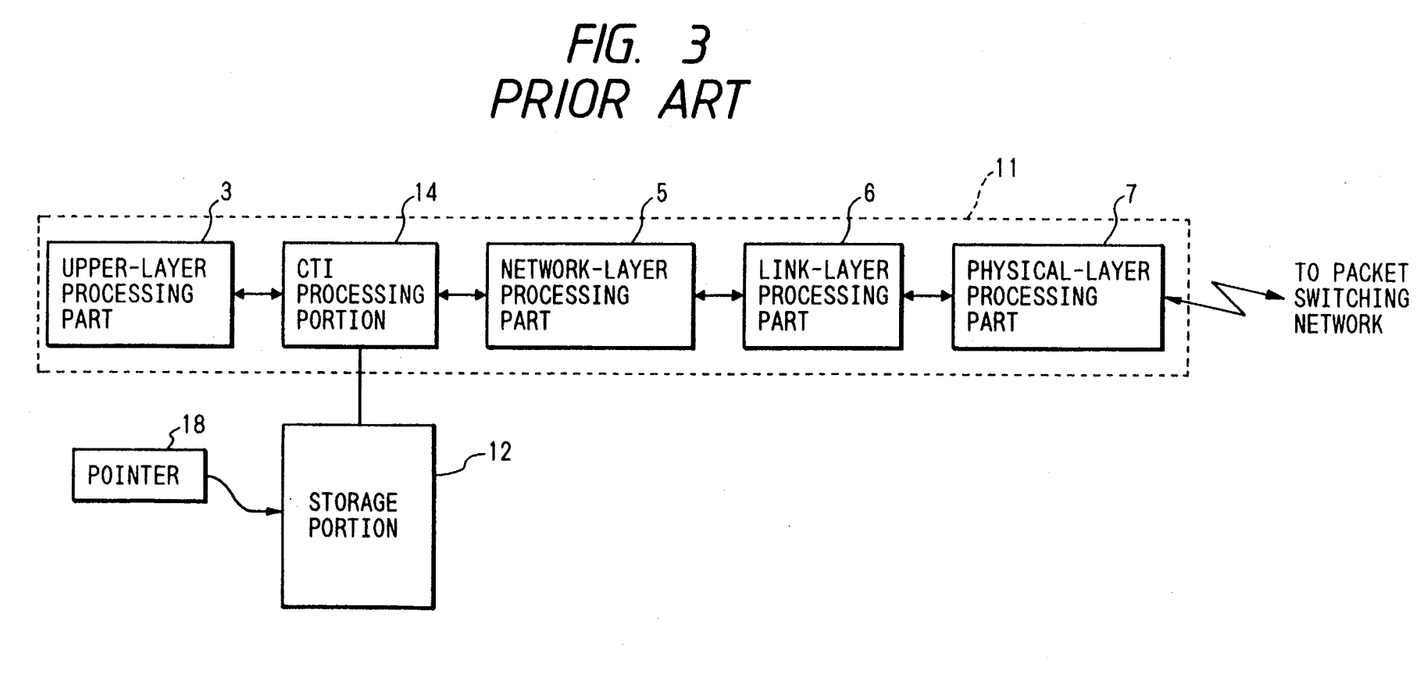
FIG. 3 is a schematic block diagram for illustrating the configuration of a conventional communication device.

Referring now to FIG. 3, there is schematically shown the configuration of a conventional communication device of such a type. In this figure, reference numeral 11 designates a communication portion for performing a communication processing to communicate with a packet switching network. As is shown in this figure, the communication portion 11 comprises a physical-layer processing part 7 for performing a processing of first-layer (or physical-layer) protocols of layered communication protocols, a link-layer processing part 8 for performing a processing of second-layer (or link-layer) protocols thereof, a network-layer processing part 5 for performing a processing of third-layer (or network-layer) protocols thereof and an upper-layer processing part 3 for performing a processing of layers, the order of which is higher than third layer thereof, and a communication tracing information processing portion 14. Further, reference numeral 12 denotes a storage portion for storing communication-tracing-information; and 18 a pointer portion for storing a pointer used to manage memory addresses in the storage portion 12.

Figure 4:
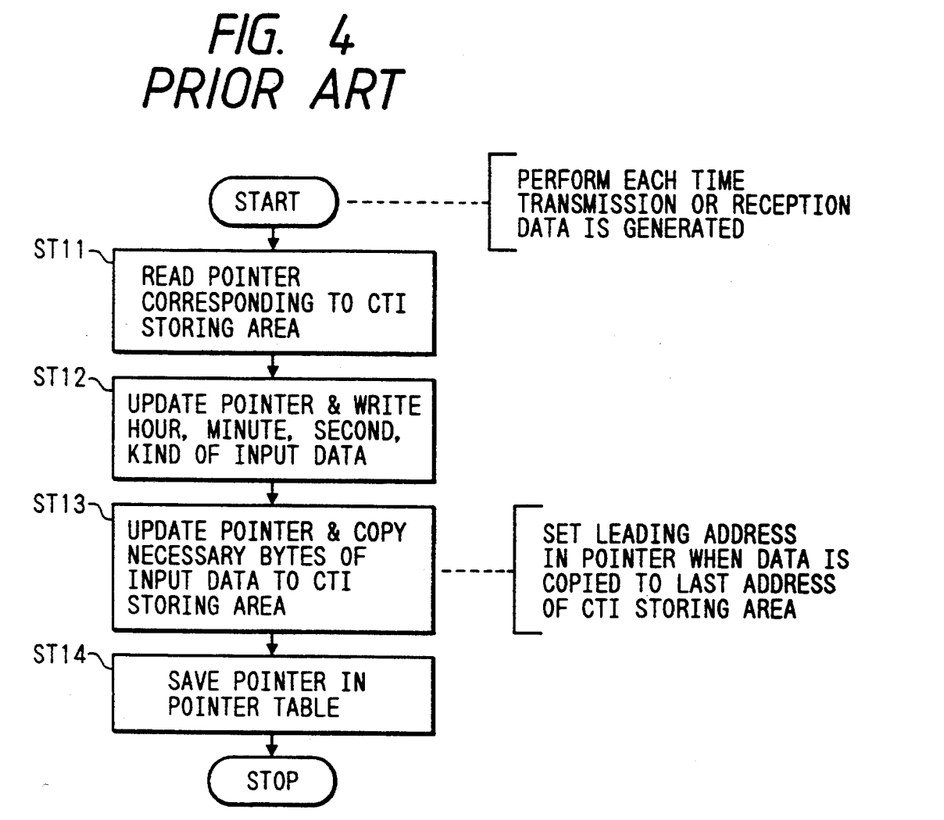
FIG. 4 is a flowchart for illustrating an operation of a communication-tracing-information processing portion of the conventional communication device of FIG. 3.

Hereinafter, an operation of the communication-tracing-information processing portion 14 will be described by referring to FIG. 4. First, in step ST11, the communication-tracing-information processing portion 14 fetches a pointer from the pointer portion 18 at the time of a transmission or reception of data. Then, the communication-tracing-information processing portion 14 writes data respectively representing time and the transmission or reception to the storage portion 12 from an address indicated by the pointer updating the pointer in step ST12. Subsequently, in case of the transmission, the communication-tracing-information processing portion 14 inputs transmission data having a format of FIG. 5 from the upper-layer processing part 3 and then writes bytes of a necessary number of the transmission data to the storage portion 12 from a leading byte thereof in step ST13, updating the pointer. Further, in case of the reception, the communication-tracing-information processing portion 14 inputs reception data from the network-layer processing part 5 and then writes bytes of a necessary number of the reception data to the storage portion 12 from a leading byte thereof in step ST13, updating the pointer. Upon completion of the writing of the transmission or reception data to the storage portion 12 in step ST13, the updated pointer is saved in the pointer portion 18 in step ST14. In this way, communication-tracing-information having a format of FIG. 6 is sequentially stored in the storage portion 12. Incidentally, when data is written to the last address of the storage portion 12, the pointer is changed in such a manner to indicate the leading address of the storage portion 12. The subsequent communication-tracing-information is written over the information stored in the storage portion from the leading address thereof.

When a communication fault occurs in a system employing this conventional communication device, the communication-tracing-information stored in the storage portion 12 as above described is used for an analysis of the cause of the fault.

However, the conventional communication device having the above described configuration, in which communication-tracing-information is simply written to a storage area in the order of occurrence of corresponding transmission or reception data, has a drawback in that it is not seldom to fail to obtain sufficient communication-tracing-information required for an analysis of a communication fault. This is due to the fact that communication-tracing-information is simply written to a storage area or portion, the storage capacity of which is limited, in the order of occurrence of corresponding transmission or reception data and thus communication-tracing-information relating to the communication fault is often lost by overwriting communication-tracing-information corresponding to a subsequent transmission or reception.

Incidentally, the frequency of losing communication-tracing-information relating to a communication fault can be reduced by increasing the storage capacity of the storage portion. The conventional communication device, however, comes to have other drawbacks as follows. Namely, increase in storage capacity inevitably results in increase in cost of the storage portion and is thus uneconomical. Moreover, increase in communication-tracing-information stored in the storage portion makes a search for communication-tracing-information necessary for an analysis of a communication fault very difficult and is liable to increase a time required to analyze a communication fault.

The present invention is accomplished to eliminate the drawbacks of the conventional communication device.

It is, accordingly, an object of the present invention to provide a communication device which can obtain communication-tracing-information necessary for an analysis of a communication fault more surely without increasing the storage capacity required to store communication-tracing-information.

Further, it is another object of the present invention to provide a communication device which can store communication-tracing-information in a storage portion correspondingly to each logical channel and save communication-tracing-information in another storage device each time a communication fault occurs, thereby surely holding existing data at the time of an occurrence of a communication fault and saving the data in the order of occurrences of corresponding communication faults to facilitate analyses of the communication faults.

SUMMARY OF THE INVENTION

Generally, in a packet switching network, a transmitting station is communicated with a receiving station by providing a plurality of logical channels (namely, virtual circuits or lines) therebetween, namely, by using a physical line as a plurality of lines. Moreover, a logical channel No. is added to a network header of transmission or reception data.

To achieve the foregoing object, in accordance with an aspect of the present invention, there is provided a communication device connected to a packet network, which comprises a storage portion having communication-tracing-information storing areas respectively assigned to logical channels and means for identifying a logical channel by a network header of transmission or reception data obtained from the packet network when the transmission or reception data is generated, and for writing communication-tracing-information corresponding to the generated transmission or reception data to a communication-tracing-information storing-area assigned to the identified logical channel.

With the above described configuration, communication-tracing-information corresponding to each logical channel is stored in the communication-tracing-information storing area corresponding to the same logical channel. Thus the stored communication-tracing-information corresponding to a logical channel is not written over that corresponding to another logical channel. Therefore, if a communication fault occurs correspondingly to a logical channel and thereafter a normal communication processing is effected correspondingly to another logical channel, communication-tracing-information corresponding to the logical channel, in which the communication fault has occurred, can be retained. Thus communication-tracing-information corresponding to a logical channel, in which a communication fault occurs, can surely be retained and easily be fetched without increasing the cost. Consequently, an analysis of the communication fault can efficiently be performed. A feature of one aspect of the invention is that, upon writing the communication-tracing-information corresponding to the generated transmission or reception data to a trail address of a particular communication-tracing-information storing area assigned to a particular identified logical channel, the processing means overwrites subsequent communication-tracing-information beginning at a leading address of the particular communication-tracing information storing area assigned to that particular identified channel. Another feature of this aspect of the invention is that the processing means comprises overwrite means for overwriting the particular communication-tracing-information storing area only when writing communication-tracing-information for the particular identified logical channel.

Further, to achieve the foregoing object, in accordance with another aspect of the present invention, there is provided a communication device connected to a packet network, which comprises a processing means for identifying a logical channel by a network header of transmission or reception data obtained from the packet network when the transmission or reception data is generated, and for generating communication-tracing-information corresponding to the generated transmission or reception data and to the identified logical channel; and a storage portion having communication-tracing-information which is generated by the communication-tracing-information processing means, stored in a respectively corresponding communication-tracing-information storing area assigned to the identified logical channel, a save memory for storing therein the communication-tracing-information stored in the storage portion and for saving the communication-tracing-information, from the storage portion, upon occurrence of a communication fault. Further, when communication-tracing-information corresponding to each logical channel is saved in the save memory, the save-memory control portion controls the save memory such that communication-tracing-information is serially shifted among save areas of the save memory (for instance, communication-tracing-information to be saved this time is saved in a save area of the save memory, which stores communication-tracing-information saved the last time, and on the other hand, the communication-tracing-information saved the last time is saved this time in another save area of the save memory, which stores communication-tracing-information saved two times ago).

With the above described configuration, a logical channel corresponding to transmission or reception data is identified by a network header thereof and then the transmission or reception data is stored in a storage area of the storage portion corresponding to the identified logical channel. If no communication fault occurs, communication-tracing-information is repeatedly overwritten each time when the storage portion having the storage areas respectively corresponding to the logical channels becomes full. Thus the storage portion stores a constant quantity of communication-tracing-information. Each time when a communication fault occurs, communication-tracing-information at that time is stored in the save memory. Consequently, information or data required for an analysis of a communication fault can be obtained easily and securely.

Further, in case where a succession of communication faults occur, communication-tracing-information (hereunder sometimes referred to as communication-tracing-data) respectively corresponding to the communication faults is stored in the save memory in the order of occurrences of the communication faults. Namely, the arrangement of the saved communication-tracing-data on a data list thereof corresponds to a time series of the communication faults. In other words, a time series of communication-tracing-information is obtained. For example, in the data list, communication-tracing-data saved correspondingly to a currently occurred communication fault should be preceded by communication-tracing-data saved correspondingly to another communication fault having occurred the last time. Similarly, the communication-tracing-data saved correspondingly to the communication fault having occurred the last time should be preceded by communication-tracing-data saved correspondingly to still another communication fault having occurred two times ago. Thus the relation in indices between communication-tracing-data clearly indicates the order of occurrences of corresponding communication faults. This is good for an analysis of a communication fault. Consequently, an analysis of a communication fault can be facilitated.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which.

DETAILED DESCRIPTION OF THE PREFERRED EMBODIMENTS

Hereinafter, preferred embodiments of the present invention will be described in detail by referring to the accompanying drawings.

Figure 1:
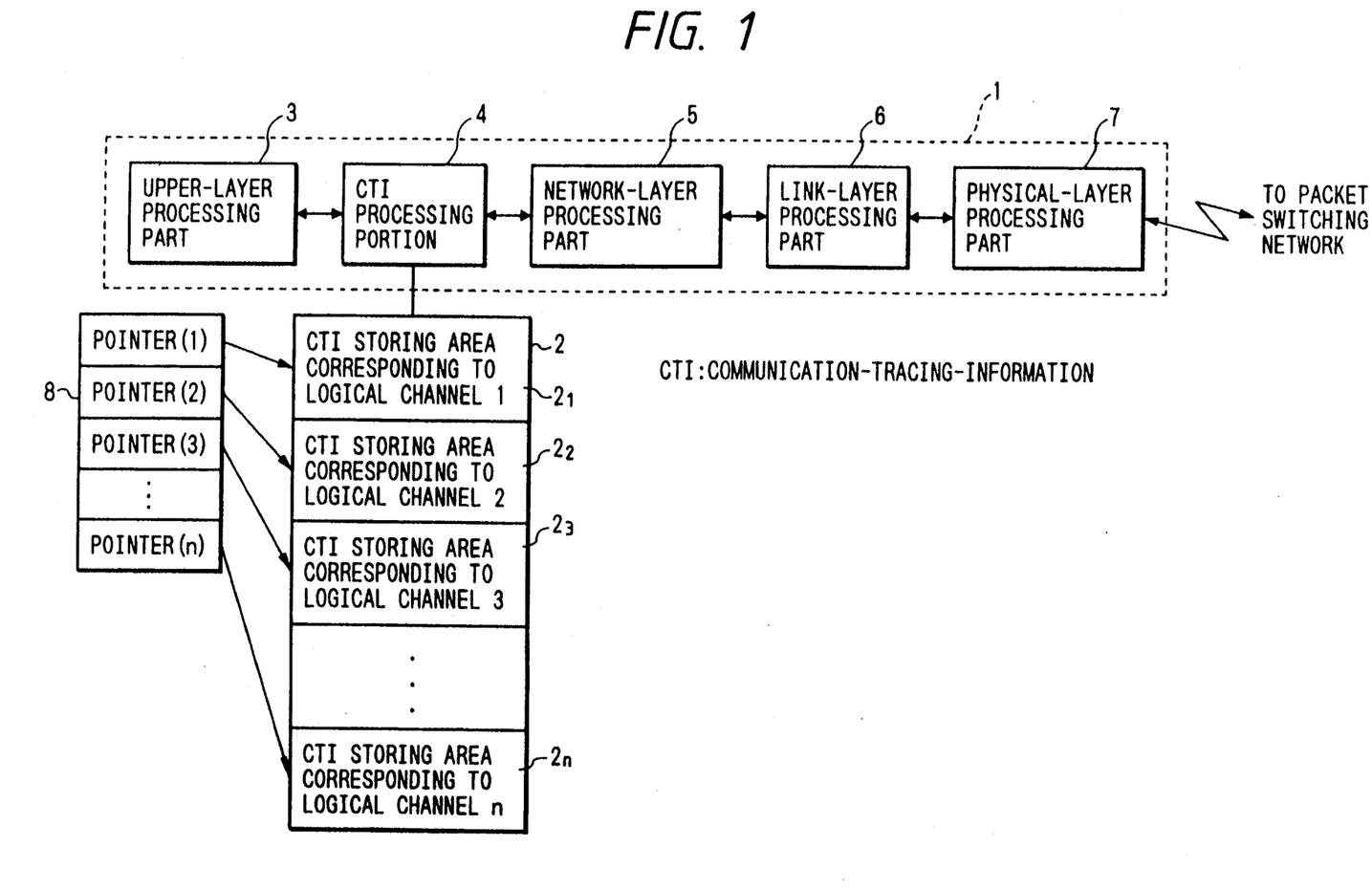
FIG. 1 is a schematic block diagram for illustrating the configuration of a communication device embodying the present invention (hereunder sometimes referred to as a first embodiment of the present invention)

Referring first to FIG. 1, there is schematically shown the configuration of a communication device (namely, the first embodiment) embodying the present invention. In this figure, like reference characters designate like or corresponding parts of FIG. 3.

Further, in FIG. 1, reference numeral 1 represents a communication processing portion which is different from the communication processing portion 11 of FIG. 3 in that the communication-tracing-information processing portion 14 of FIG. 3 is replaced with that 4. This communication-tracing-information processing portion 4 is adapted to identify a logical channel corresponding to input data (namely, transmission or reception data) from the upper-layer processing part 3 or the network-layer processing part 5 and perform an operation of storing communication-tracing-information corresponding to each logical channel.

Furthermore, reference numeral 2 designates a storage portion to be accessed by the communication-tracing-information portion 4. The storage portion 2 includes n communication-tracing-information storing areas 21, ..., 2n respectively assigned to first to nth logical channels. Incidentally, a pointer for managing a writing address, to which communication-tracing-information corresponding to each logical channel is written, in each of the communication-tracing-information storing areas 21, ..., 2n is stored in the pointer table 8. Further, the communication-tracing-information processing portion 4 refers to or searches the table 8 for the pointers and updates the pointers stored therein.

Figure 2:
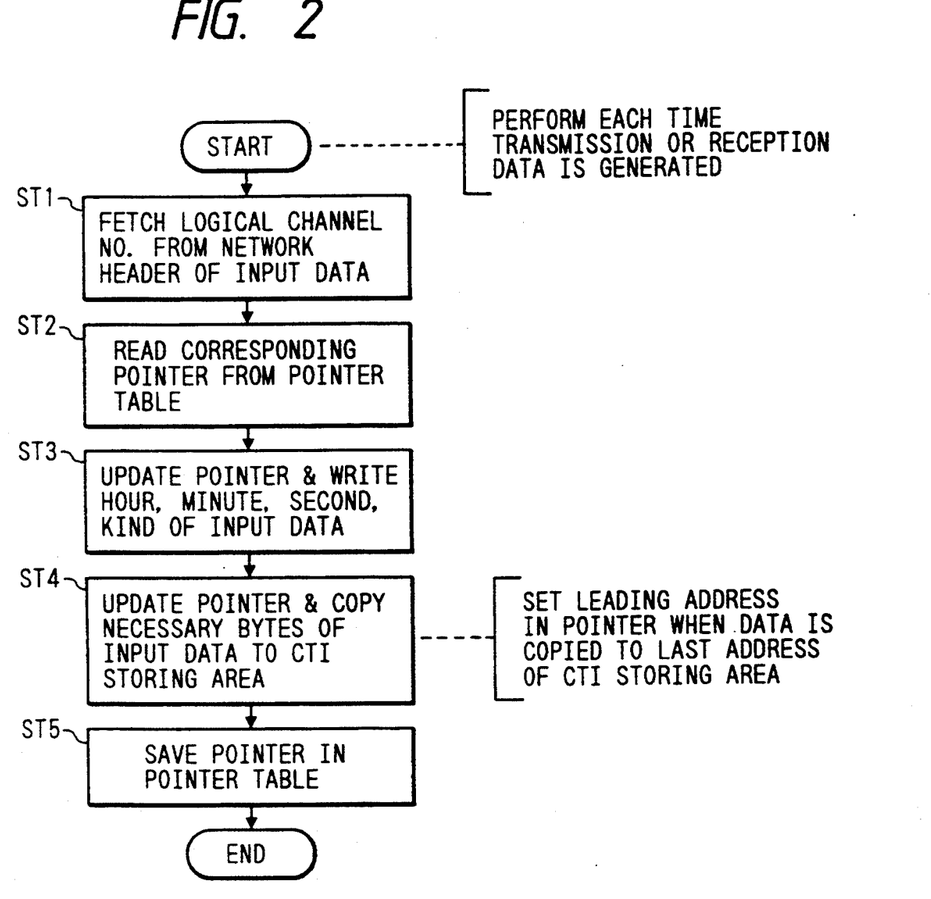
FIG. 2 is a flowchart for illustrating an operation of a communication-tracing-information processing portion of the communication device of FIG. 1.

Hereinafter, an operation of the communication-tracing-information processing portion 4 will be described by referring to FIG. 2.

Figure 5:
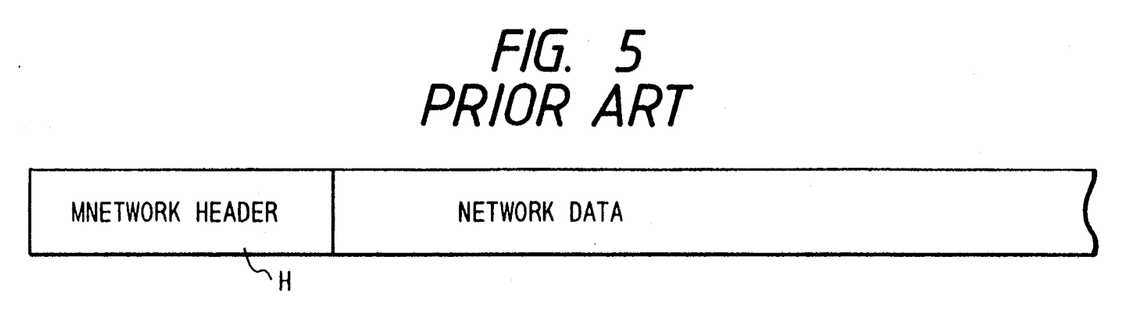
FIG. 5 is a diagram for illustrating the format of transmission or reception data.
Figure 6:
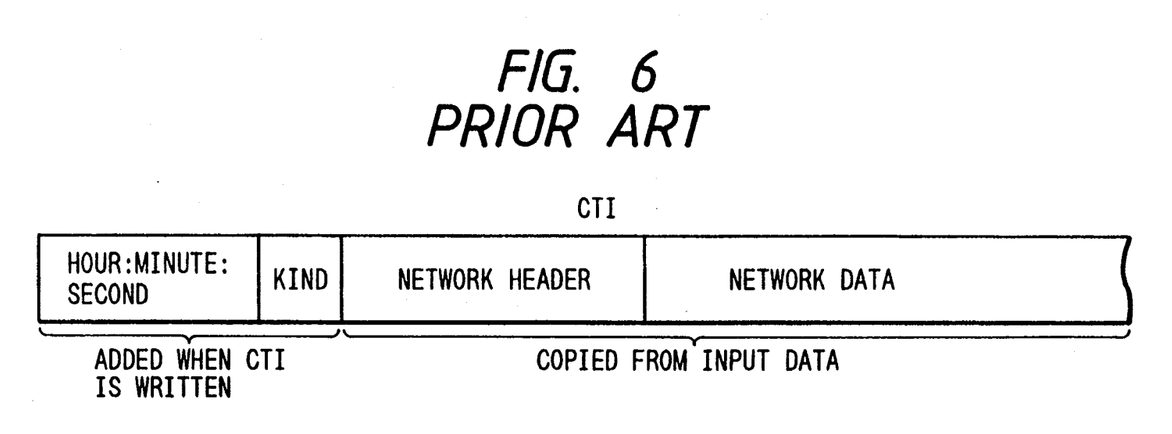
FIG. 6 is a diagram for illustrating the format of communication-tracing-information.

Namely, when transmission or reception data having the format of FIG. 5 is input thereto from the upper-layer processing part 3 or from the network-layer processing part 5, the communication-tracing-information processing portion 4 fetches or obtains a logical channel No. from a network header portion H of the input data in step ST1. Here, let i denote the logical channel No. Subsequently, the communication-tracing-information processing portion 4 looks up the pointer (i) corresponding to the logical channel No. i in the pointer table 8 in step ST2.

Next, in step ST3, data indicating time and data indicating the kind of the input data (namely, transmission or reception data) are serially written in this order to the communication-tracing-information storing area 2i assigned to the logical channel No. i from an address indicated by the pointer (i), updating the pointer (i). Then, a necessary number of bytes of the input data from the leading byte thereof are sequentially written in step ST4 to the communication-tracing-information storing area 2i subsequently to the data indicating the kind of the input data, updating the pointer (i). Upon completion of the writing of the necessary number of bytes of the input data, the pointer (i) is saved in the pointer table 8 in step ST5. Thus the communication-tracing-information corresponding to the logical channel No. i and having the format of FIG. 6 is stored in the storing area 2i.

Incidentally, if the communication-tracing-information is written to the end or trail address in the storing area 2i in steps ST3 and ST4, the subsequent communication-tracing-information to be written is overwritten thereto from the leading address again. This is the same with a writing of communication-tracing-information to the storing area corresponding to each of the other logical channels.

As above described, communication-tracing-information corresponding to each logical channel is stored in one of the storing areas 21, ..., 2n, which corresponds to the same logical channel. Thus the stored communication-tracing-information corresponding to a logical channel is not written over that corresponding to another logical channel. Therefore, if a communication fault occurs correspondingly to a logical channel and thereafter a normal communication processing is effected correspondingly to another logical channel, communication-tracing-information corresponding to the logical channel, in which the communication fault has occurred, can be retained.

Hence, communication-tracing-information corresponding to a logical channel, in which a communication fault occurs, can surely be retained and easily be fetched to be utilized for an analysis of a cause of the fault. Moreover, the storing areas respectively corresponding to the logical channel areas are independent from one another. Therefore, communication-tracing-information corresponding to a necessary channel can be fetched very easily. Consequently, an analysis of the communication fault can efficiently be performed. Furthermore, it is not necessary to increase the total storage capacity of the storing areas substantially. As a consequence, increase in cost of the device can be prevented in substance.

Figure 7:
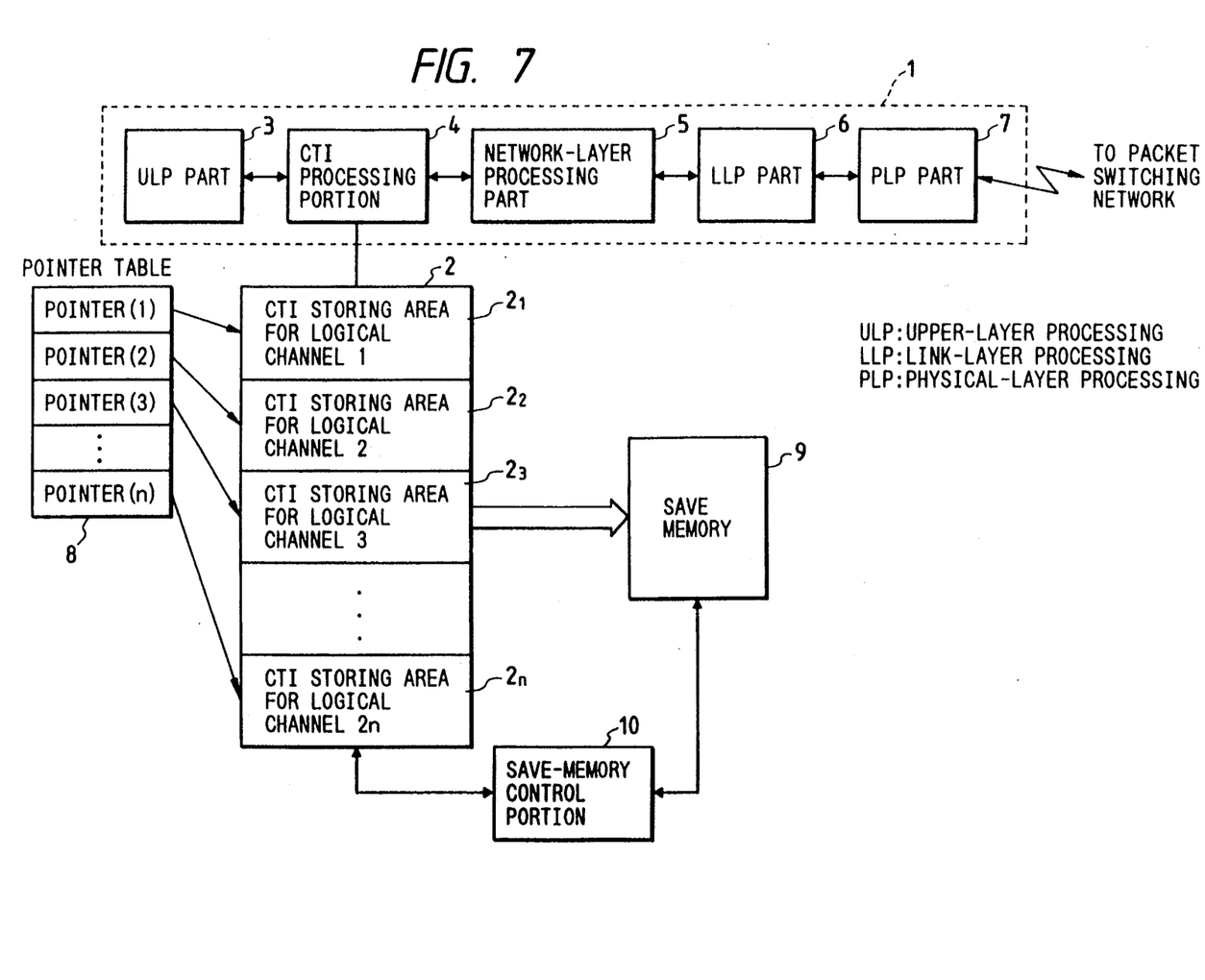
FIG. 7 is a schematic block diagram for illustrating the configuration of another communication device embodying the present invention (hereunder sometimes referred to as a second embodiment of the present invention)

Referring next to FIG. 7, there is schematically shown the configuration of another communication device (namely, the second embodiment) embodying the present invention. In this figure, like reference characters designate like or corresponding parts of FIG. 1. Further, reference numeral 9 denotes a save memory; 10 a save-memory control portion for controlling the save memory 9 such that the save memory 9 saves the information stored in the storage portion 2 therein by regulating a save area thereof, in which the information is stored, each time when the device is reset in case where a communication fault occurs in the communication device.

Figure 8:
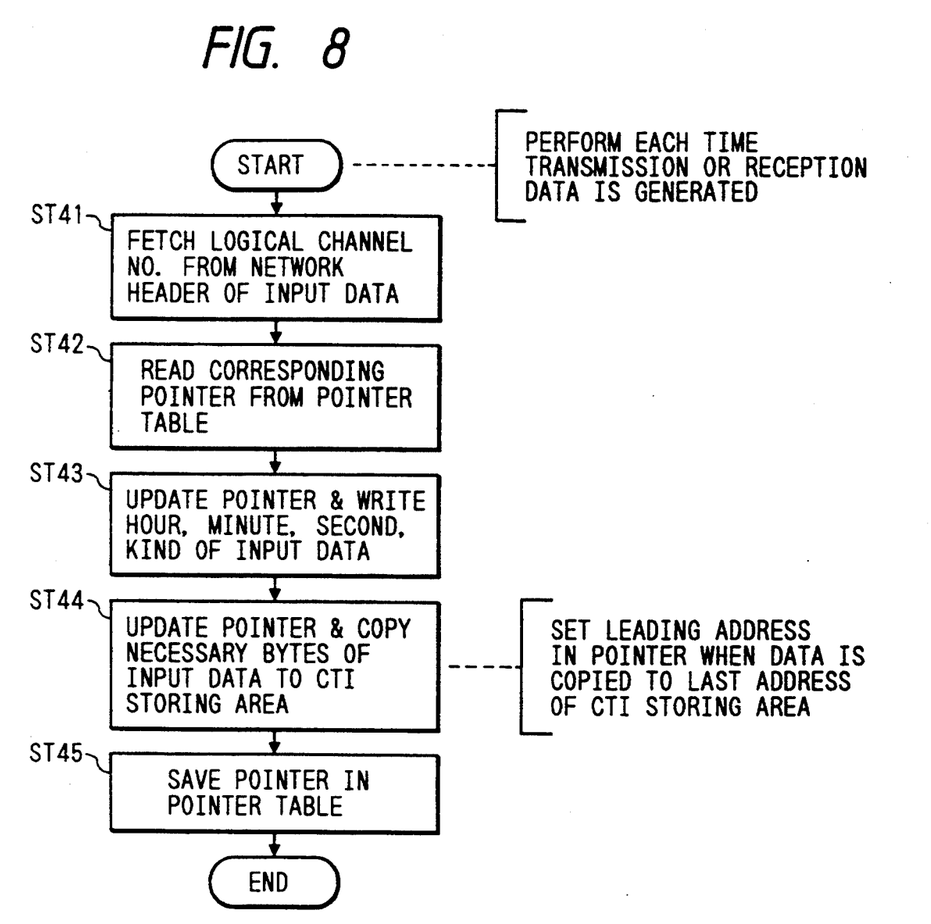
FIG. 8 is a flowchart for illustrating an operation of storing communication-tracing-information corresponding to each logical channel in a storage portion of the device of FIG. 7.

Hereinafter, an operation of the communication-tracing-information processing portion 4 will be described by referring to FIG. 8. First, when transmission or reception data having the format of FIG. 5 is input from the upper-layer processing part 3 or the network-layer processing part 5, the communication-tracing-information processing portion 4 fetches a logical channel No. from a network header portion H of the input data in step ST41. Here, it is assumed that the logical channel No. is i. Subsequently, the communication-tracing-information processing portion 4 fetches the pointer (i) corresponding to the logical channel No. i from the pointer table 8 in step ST42.

Then, in step ST43, data indicating time and data indicating the kind of the input data are serially written in this order to the communication-tracing-information storing area 2i assigned to the logical channel No. i from an address indicated by the pointer (i), updating the pointer (i). Thereafter, a necessary number of bytes of the input data from the leading byte thereof are sequentially written in step ST44 to the communication-tracing-information storing area 2i subsequently to the data indicating the kind of the input data, updating the pointer (i). Upon completion of the writing of the necessary number of bytes of the input data, the pointer (i) is saved in the pointer table 8 in step ST45. Thus the communication-tracing-information corresponding to the logical channel No. i and having the format of FIG. 6 is stored in the storing area 2i.

Incidentally, if the communication-tracing-information is written to the end or trail address in the storing area 2i in steps ST43 and ST44, the subsequent communication-tracing-information to be written is overwritten thereto from the leading address again. This is the same with a writing of communication-tracing-information to the storing area corresponding to each of the other logical channels.

Figure 9:
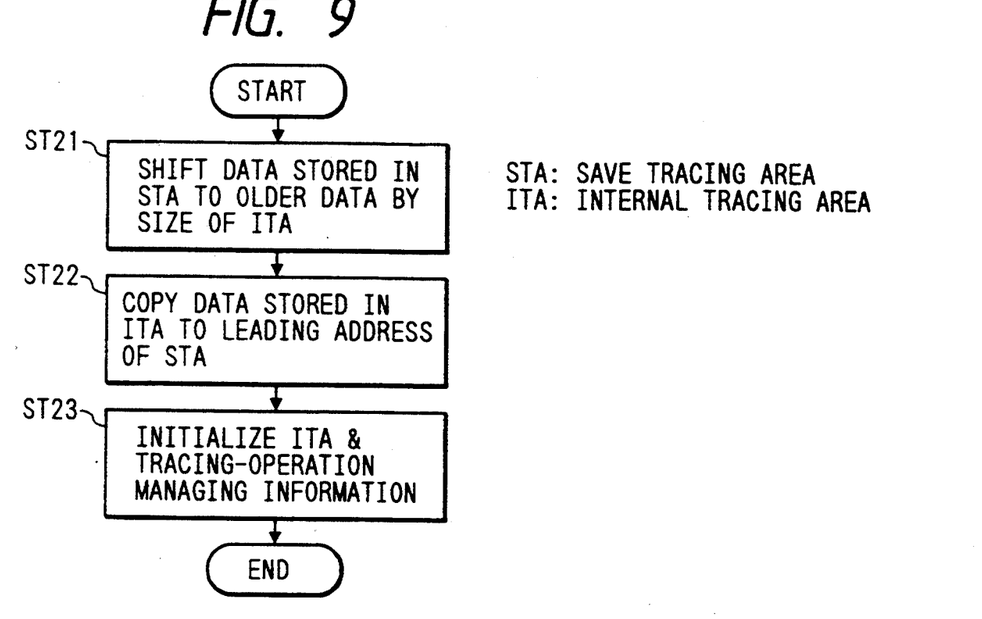
FIG. 9 is a flowchart for illustrating an operation of saving communication-tracing-information stored in the storage portion of the device of FIG. 7 in a save memory thereof.

Next, an operation of the device to be performed in when a communication fault occurs will be described hereinbelow. FIG. 9 is a flowchart for illustrating an operation of saving the data or information stored in the storage portion 2 in the save memory 9 when a communication fault occurs. The communication device is reset each time when a communication fault happens. The memory control portion 10 saves the data or information, which is stored in the storage portion 2, in the save memory 9.

Figure 10A:
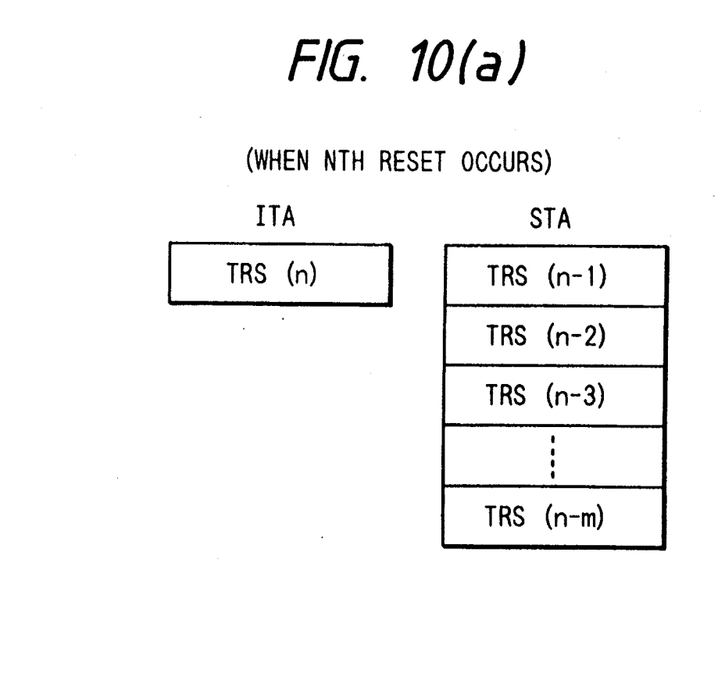
FIG. 10(a)–(b) are a diagram for illustrating how communication-tracing-information is stored in each of the storage portion and the save memory of the device of FIG. 7.
Figure 10B:
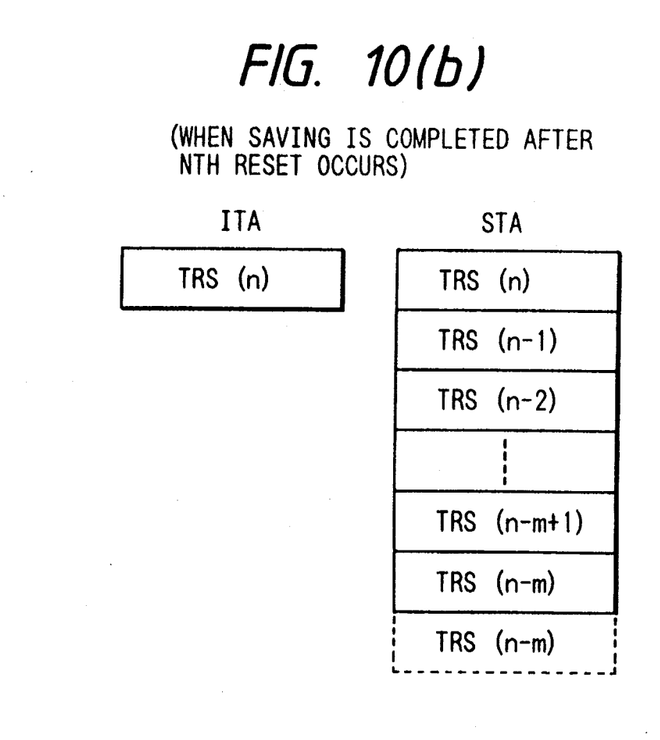

FIG. 10 is a diagram for illustrating how the data or information stored in the storage portion 2 is saved in the save memory 9. FIG. 10(a) illustrates the states of storing areas of the storage portion 2 and the save memory 9 immediately after an nth resetting is effected. The memory capacity of the save memory 9 is set as enough to store the data or information stored in the storage portion 2 correspondingly to a predetermined number of times, which is assumed to be m times in this embodiment, of the resettings of the device. The right column of FIG. 10(a) illustrates the states of m storage areas (hereunder sometimes referred to as save tracing areas) of the save memory 9, in which the data or information saved from the storage portion 2 correspondingly to the m resettings of the device just prior to the nth resetting thereof (namely, from an (n−m)th resetting to an (n−1)th resetting thereof) are stored, respectively. On the other hand, the left column of FIG. 10(a) shows the state of a storage area (hereunder sometime referred to as an inner tracing area) of the storage portion 2 when an nth resetting of the device is effected but data or information stored in the storage portion 2 has not been saved yet.

Further, FIG. 10(b) illustrates the states of the save tracing areas and the inner tracing area when the saving of the data or information stored in the storage portion 2 is finished after the nth resetting of the device. As is viewed in this figure, data TRS(n) is saved in the save memory 9, though data TRS(n−m) indicated by dashed lines at the bottom of the right column is discarded.

As is seen from FIGS. 10(a) ad 10(b), the data saved this time is stored in the top save-tracing area. Further, the data saved at the last time of resetting the device is stored in the second storage area from the top save-tracing area. Moreover, the third save-tracing area from the top save-tracing area stores the data saved when the device is reset two times ago. Thus the time series data relating to the communication faults are obtained. The time series data is good for analyses of the communication faults.

Figure 11A:
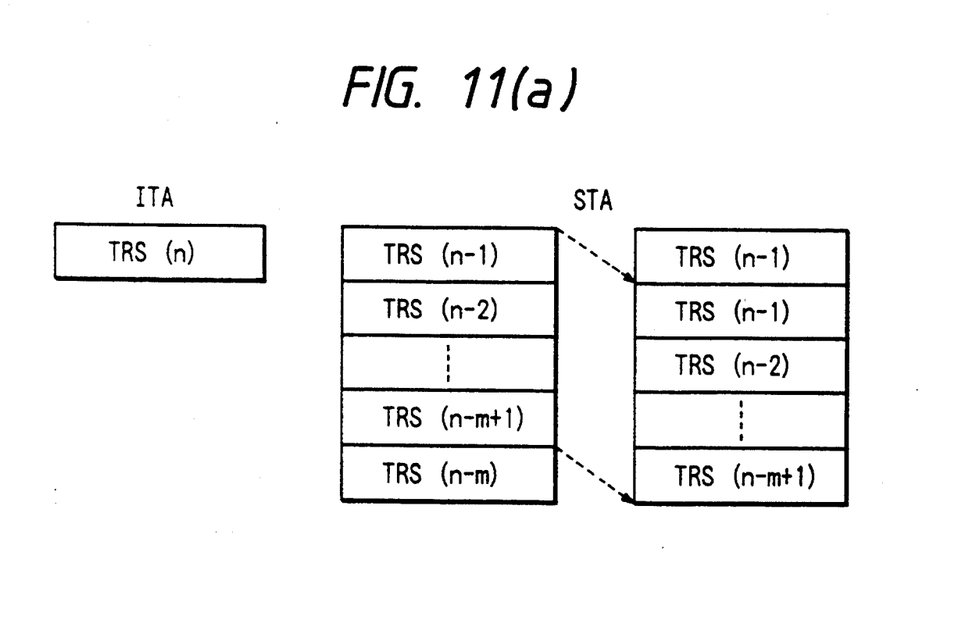
FIG. 11(a)–(b) are a diagram for illustrating how data stored in the storage portion of the device of FIG. 7 is saved in the save memory thereof.
Figure 11B:
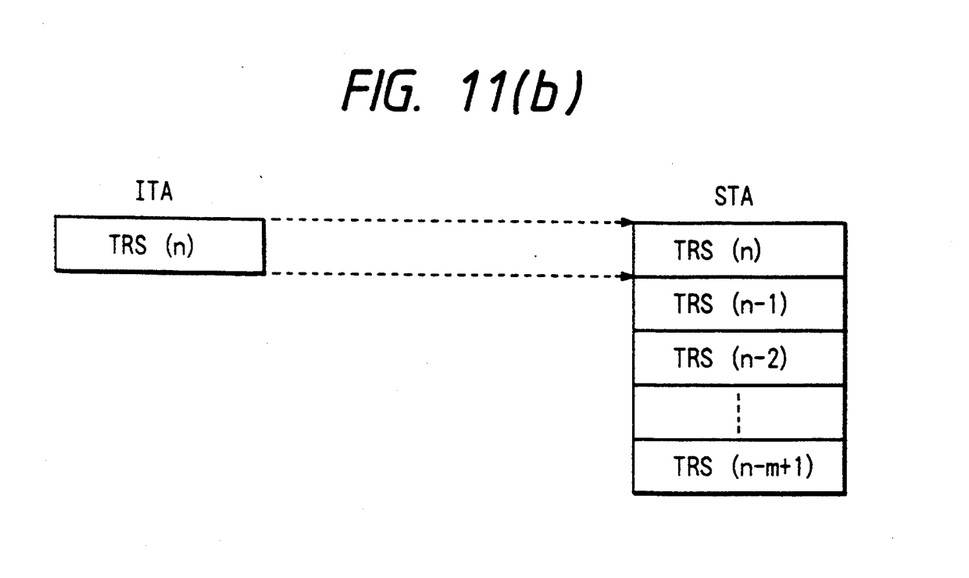

Referring now to FIG. 9, in step ST21, the save memory control portion 10 shifts the data stored in the save tracing area in the direction from the top to the bottom save-tracing area by the size of the inner tracing area of the storage portion 2 when the device is reset, as viewed in FIG. 11(a). Subsequently, the control portion 10 copies the data stored in the inner tracing area to the leading or top save-tracing area in step ST22 as illustrated in FIG. 11(b). Then, storage areas for storing tracing-operation managing information, for instance, the inner tracing areas of the storage portion 2 and the pointer table 8 are initialized in step ST23.

Figure 12:
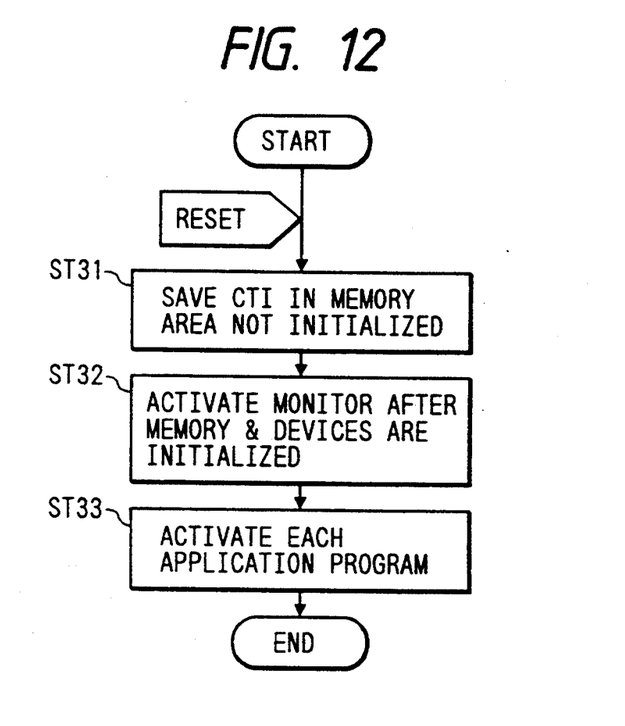
FIG. 12 is a flowchart for illustrating an activation processing to be performed by the device of FIG. 7.

FIG. 12 is a flowchart for illustrating processings to be effected at the time of activating and resetting the communication device. Regarding the communication-tracing-information saving processing, the communication-tracing-information stored in the storage portion 2 is saved in the save memory 9, which is not initialized, in step ST31. Then, a monitor is activated in step ST32 after an initialization of composing elements such as the storage portion employed as an initialization processing of the device is effected. Thereafter, an activation of each application program employed as a system activating processing is performed in step ST33.

While preferred embodiments of the present invention have been described above, it is to be understood that the present invention is not limited thereto and that other modifications will be apparent to those skilled in the art without departing from the spirit of the invention. The scope of the present invention, therefore, is to be determined solely by the appended claims.

What is claimed is:

1. A communication device connected to a packet network, comprising:

communication-tracing-information processing means for identifying a logical channel by a network header or transmission reception data obtained from the packet network when the transmission or reception data is generated, and for generating communication-tracing-information corresponding to the generated transmission or reception data and to the identified logical channel;

a storage portion having communication-tracing-information, which is generated by the communication-tracing-information processing means, stored in a respectively corresponding communication-tracing-information storing area assigned to the identified logical channel;

a save memory for storing therein the communication-tracing-information stored in the storage portion; and a save-memory control portion for controlling an operation of the save memory and for saving the communication-tracing-information in the save memory from the storage portion upon occurrence of a communication fault.

2. The communication device according to claim 1, further comprising a pointer table portion for storing pointers respectively corresponding to the logical channels, each of the pointers indicating an address in a respective one of the communication-tracing-information storing areas corresponding thereto, in which the corresponding communication-tracing-information is written, wherein the communication-tracing-information processing means refers to and updates the pointers when writing communication-tracing-information to the storage portion.

3. The communication device according to claim 1, wherein the save-memory control portion controls the save memory such that communication-tracing-information is serially shifted among save areas of the save memory when communication-tracing-information corresponding to each logical channel is saved in the save memory.

* * * * *